United States Patent
Epstein-Barash et al.

(10) Patent No.: US 12,527,817 B2
(45) Date of Patent: Jan. 20, 2026

(54) MANUFACTURING OF SELENIUM DISULFIDE COMPOSITIONS

(71) Applicant: Azura Ophthalmics Ltd., Tel Aviv (IL)

(72) Inventors: Hila Epstein-Barash, Shoham (IL); Shimon Nahum, Petach-Tikva (IL); Shimon Amselem, Rehovot (IL); Yair Alster, Tel Aviv (IL)

(73) Assignee: Azura Ophthalmics Ltd., Tel Aviv (IL)

( * ) Notice: Subject to any disclaimer, the term of this patent is extended or adjusted under 35 U.S.C. 154(b) by 423 days.

(21) Appl. No.: 17/855,435

(22) Filed: Jun. 30, 2022

(65) Prior Publication Data

US 2022/0347207 A1    Nov. 3, 2022

Related U.S. Application Data

(63) Continuation of application No. PCT/IB2020/001094, filed on Dec. 30, 2020.

(60) Provisional application No. 62/956,512, filed on Jan. 2, 2020.

(51) Int. Cl.

| | |
|---|---|
| A61K 33/04 | (2006.01) |
| A61K 9/06 | (2006.01) |
| A61K 41/17 | (2020.01) |
| A61K 47/06 | (2006.01) |
| A61K 47/12 | (2006.01) |
| A61K 47/14 | (2017.01) |
| A61K 47/34 | (2017.01) |
| A61K 47/44 | (2017.01) |

(52) U.S. Cl.
CPC ............... *A61K 33/04* (2013.01); *A61K 9/06* (2013.01); *A61K 41/17* (2020.01); *A61K 47/06* (2013.01); *A61K 47/12* (2013.01); *A61K 47/14* (2013.01); *A61K 47/34* (2013.01); *A61K 47/44* (2013.01)

(58) Field of Classification Search
CPC .......... A61K 33/04; A61K 9/06; A61K 41/17; A61K 47/06; A61K 47/12; A61K 47/14; A61K 47/34; A61K 47/44; A61K 9/0014; A61K 9/0048; A61P 27/02; A61P 27/04
See application file for complete search history.

(56) References Cited

U.S. PATENT DOCUMENTS

| | | | | |
|---|---|---|---|---|
| 6,861,411 B1 * | 3/2005 | Ahmed | ............... | A61K 31/7048 536/7.4 |
| 9,463,201 B2 | 10/2016 | Alster et al. | | |
| 2016/0199405 A1 | 7/2016 | Sutich | | |
| 2016/0367676 A1 * | 12/2016 | Burnam | ............... | A61P 43/00 |

FOREIGN PATENT DOCUMENTS

| | | | |
|---|---|---|---|
| CN | 106727285 A | 5/2017 | |
| WO | WO-2017055924 A2 | 4/2017 | |
| WO | WO-2017178892 A2 * | 10/2017 | ............... A61P 27/02 |
| WO | WO-2021090070 A2 | 5/2021 | |
| WO | WO-2021136968 A2 | 7/2021 | |

OTHER PUBLICATIONS

Spectrum. Safety Data Sheet. (Year: 2018).*
Jokl et. al. Bacterial contamination of ophthalmic solutions used in an extended care facility. Br J Ophthalmol 2007;91:1308-1310 (Year: 2007).*
Bao "Physicochemical Attributes and Dissolution Testing of Ophthalmic Ointments" Int J Pharm. May 15, 2017; 523(1): 310-319. (Year: 2017).*
Patere "Influence of Manufacturing Process Variables on the Properties of Ophthalmic Ointments of Tobramycin" Pharm Res (2018) 35: 179 (Year: 2018).*
Bahn. The treatment of seborrheic blepharitis. South Med 47(8):749-53 (1954).
Cohen et al. Use of selsun in blepharitis marginalis. Am J Ophthalmol 38(4):560-562 (1954).
Thygeson et al. Seborrheic blepharitis. Trans Am Ophthalmol Soc. 52:173-88 (1954-1955).
Wong et al. Selenium (Selsun) in the Treatment of Marginal Blepharitis. AMA Arch Ophthalmol 55(2):246-253 (1956).
1.2.2 Congealing point. The International Pharmacopoeia 2019, retrieved from https://apps.who.int/phint/pdf/b/7.1.2.2.1.2.2-Congealing-point.pdf.
Aimsizer. 101—What is D90. Oct. 29, 2019 retrieved from http://www.aimsizer.com/faqs-what-is-d90.html.
PCT/IB2020/001094 International Invitation to Pay Additional Fees dated May 5, 2021.
PCT/IB2020/01094 International Search Report and Written Opinion dated Jul. 27, 2021.
Schieving. The Seven Most Common Grades for Chemicals and Reagents. Nov. 2017 retrieved from https://www,labmanager.com/business-management/the-seven-most-common-grades-for-chemicals-and-reagents-2655.
Deardorff. Chapter 86: Ophthalmic Preparations. Remington's Pharmaceutical Sciences (Osol A (Ed). pp. 1498-1517 (1980).
Lavyel, Selsunef Ointment to Treat Squamous Blepharitis. American Journal of Ophthalmology 49:820-821 (1960).
Post et al. Demodex Folliculorum and Blepharitis Arch. Dermatol. 88(3):298-302 (1963).

* cited by examiner

*Primary Examiner* — Ali Soroush
*Assistant Examiner* — Rajan Pragani
(74) *Attorney, Agent, or Firm* — Faegre Drinker Biddle & Reath LLP (57) ABSTRACT

Described herein are methods for the manufacture of compositions useful for the treatment of meibomian gland dysfunction. Said methods utilize rheological properties of petrolatum induced by a high shear mixing feature of the method. The products of the methods of manufacture described herein are stable anhydrous composition of selenium disulfide which are substantially free of selenium disulfide agglomerates and degradation products.

15 Claims, 4 Drawing Sheets

MANUFACTURING OF SELENIUM DISULFIDE COMPOSITIONS

CROSS REFERENCE

This application is a continuation of International Application No. PCT/IB2020/001094, filed internationally on Dec. 30, 2020, which claims the benefit of U.S. Provisional Application No. 62/956,512, filed on Jan. 2, 2020, all of which are hereby incorporated by reference in their entireties.

BACKGROUND OF THE INVENTION

Meibomian gland dysfunction (MGD) is a leading contributor to dry eye syndrome and is often characterized by keratin-based obstruction of the gland, reduction in meibum quantity and quality, and increased viscosity of lipids produced by meibomian glands. Described herein are methods for the manufacture of (e.g., anhydrous/hydrous) selenium disulfide formulations which are chemically and physically stable, substantially free of aggregates, and substantially free of surfactants and dispersing agents. Such formulations show minimal diffusion onto the ocular surface and are useful for the treatment and/or prevention of MGD.

SUMMARY OF THE INVENTION

Manufacture of selenium disulfide formulations that are physically and chemically stable is challenging, particularly at large scale. Physical stability can be difficult to achieve due to the high likelihood of aggregation of the selenium disulfide particles, especially when formulated on a large scale. Moreover, chemical stability can be difficult to achieve due to the reactivity of selenium disulfide, such as with oxygen and/or heat. Processes described herein provide for methods of making (e.g., physically and/or chemically) stable selenium disulfide compositions. Also provided herein are selenium disulfide containing compositions, such as making (e.g., physically and/or chemically) stable selenium disulfide compositions.

In some embodiments, processes provided herein of making a composition comprise mixing selenium disulfide particles and a viscous carrier material to form a mixture, such as wherein the mixing temperature is below melting point of the viscous carrier material (e.g., during the mixing). In some embodiments, provided herein is a method of making a selenium disulfide composition by mixing selenium disulfide particles and a viscous carrier material to form a mixture, such as wherein the temperature of the mixture is below congealing point of the viscous carrier material during the mixing. The present disclosure also provides a method of making a selenium disulfide composition by mixing selenium disulfide particles and a viscous carrier, such as wherein during mixing, and the temperature of the mixture is maintained below the melting and/or decomposition point of the selenium disulfide.

In some embodiments, the selenium disulfide is Selenium Sulfide USP ($SeS_2$). In some embodiments, the viscous carrier material is an ointment base. In specific embodiments, the viscous carrier material is petrolatum.

In some embodiments, the temperature of the mixture is (e.g., maintained) below about 106.5 degree Celsius during mixing. In some embodiments, the temperature of the mixture is (e.g., maintained) below about 90 degree Celsius during mixing. In some embodiments, the temperature of the mixture is (e.g., maintained) below about 70 degree Celsius during mixing. In some embodiments, the temperature of the mixture is (e.g., maintained) at a temperature of about 80 degree Celsius to about 90 degree Celsius during mixing. In some embodiments, the temperature of the mixture is below about 55 degree Celsius during mixing. In some embodiments, the temperature of the mixture is at least about 15 to about 20 degree Celsius during mixing. In some embodiments, the temperature of the mixture is from about 20 to about 25 degree Celsius during mixing. In some embodiments, the temperature of the mixture is from about 25 to about 55 degree Celsius during mixing. In some embodiments, the temperature of the mixture is from about 30 to about 50 degree Celsius during mixing. In some embodiments, the temperature of the mixture is from about 35 to about 45 degree Celsius during mixing. In some embodiments, the temperature of the mixture is 40 degree Celsius during mixing. In some embodiments, the temperature of the mixture varies during the mixing. In some embodiments, the temperature of the mixture remains constant during the mixing.

In some embodiments, the viscous carrier material has a steady flow pattern during the mixing. In some embodiments, the viscous carrier material has a steady flow pattern prior to the mixing. In some embodiments, the steady flow pattern is a vortex flow with downward acceleration along a center axis. In such embodiments, the vortex flow is created by high-shear, by high-shear Rotor-Stator mixer, by high-shear impeller or saw tooth impeller, by high-shear jet mixer, or by initial high-shear mixing and maintained with addition of low-shear mixing or propeller mixing. In some embodiments, the mixture is subject to high shear during mixing. In some embodiments, air bubbles are drawn into the steady flow pattern of the carrier material. In some instances, the air bubbles modify the rheological properties of the viscous carrier material. In certain instances, the air is released after the mixture is formed. In some embodiments, the carrier material is pre-heated to a temperature below its melting point before the steady flow pattern is formed. In some embodiments, the carrier material is petrolatum and is pre-heated to about 40 degree Celsius before the steady flow pattern is achieved.

In some embodiments, the selenium disulfide particles are added at any suitable rate. In certain embodiments, the particles are added to the steady flow pattern of the viscous carrier material, such as at a rate from 0.01 g/min to 1.5 g/min per 1 Kg of bulk product. In some embodiments, the mixing continues until the selenium disulfide particles are uniformly suspended in the carrier material. In some embodiments, the mixing continues for at least until homogeneous bulk is obtained.

In some embodiments, the methods further include a step of allowing the mixture to cool down while mixing continues. In some embodiments, the composition is cooled to about 30 degree Celsius while mixing continues. In some embodiments, the composition is cooled to about room temperature while mixing continues. In some embodiments, the methods further include a step of filling the composition to a dispenser while mixture is in its semi-solid state. In some embodiments, filling is completed by a piston filling machine. In some embodiments, the dispenser is a laminated tube. In some embodiments, the dispenser is purged with nitrogen prior to filling and it is heat-sealed after filling. In some embodiments, the methods further include a step of sterilizing the composition by gamma irradiation.

In some embodiments, the selenium disulfide particles are micronized (e.g., prior to mixing with the viscous carrier material. In some embodiments, the micronized selenium disulfide particles have an average particles size of no more than about 25 μm prior to mixing with the viscous carrier material. In some embodiments, the micronized selenium disulfide particles have a D90 of from about 1 to about 20 μm prior to mixing with the viscous carrier material. In some embodiments, the micronized selenium disulfide particles have a D90 of from about 5 to about 15 μm prior to mixing with the viscous carrier material. In some embodiments, the selenium disulfide particles have a D90 of about 8-10 μm prior to mixing with the viscous carrier material. In some embodiments, the selenium disulfide particles have a D99 of about 10-15 (e.g., about 11-12) μm prior to mixing with the viscous carrier material. In some embodiments, the selenium disulfide particles have a D50 of about 3-7 (e.g., about 4-6, or about 5) μm prior to mixing with the viscous carrier material. In some embodiments, $D_{90}$ of the selenium disulfide particles is 20 μm or less, following mixing. In some embodiments, $D_{50}$ of the selenium disulfide particles is about 10 μm or less (e.g., 3-10 μm), following mixing. In some embodiments, $D_{10}$ of the selenium disulfide particles is about 5 μm or less (e.g., about 3 μm to about 5 μm), following mixing. In some embodiments, $D_{99}$ of the selenium disulfide particles is about 50 μm or less (e.g., about 40 μm or less or about 30 μm or less), following mixing.

In some embodiments, the composition is essentially free of aggregated selenium disulfide particles. In some embodiments, the selenium disulfide particles are uniformly suspended in the carrier material in the composition. In some embodiments, the composition maintains uniformity after extended storage time for at least 12 months. In some embodiments, the composition has a batch to batch variation of less than 15% (e.g., wt. %) (e.g., less than 10%, less than 5%, less than 3%, or less than 1%) based on content of selenium disulfide (e.g., wherein selenium disulfide content of the composition is 85% to 115% on a batch to batch basis). In some embodiments, the batch to batch variation is based on 10 consecutive samples. In some embodiments, the batch to batch variation is based on consecutive samples of 20 gram per sample. In some embodiments, the composition does not exhibit visually substantial discoloration after extended storage time. In some embodiments, less than 5% of the selenium disulfide is degraded after extended storage time for at least 36 months. In some embodiments, the extended storage time is 24 months. In some embodiments, the extended storage time is 12 months.

In some embodiments, the composition further comprises one or more excipients, and wherein the excipients are mixed with the selenium disulfide particles and the viscous carrier material. In such embodiments, in some instances, the one or more excipients are susceptible to degradation at a temperature equal to or higher than the melting point of the viscous carrier material. In some instances, one or more excipients are selected from mineral oil, caprylic triglyceride, capric triglyceride, dimethicone, caprylic acid, isopropyl myristate, propylene glycol monolaurate, propylene glycol monocaprylate, or a penetration enhancer.

In some embodiments, the composition is essentially free of organic solvent. In some embodiments, the composition is essentially free of aqueous solvent. In some embodiments, the composition is essentially free of any preservative.

The present disclosure provides a selenium disulfide composition made by the method described herein.

The present disclosure provides a selenium disulfide composition comprising micronized selenium disulfide particles mixed with a viscous carrier material, wherein the micronized selenium disulfide particles have an average particles size of no more than 25 microns. In some embodiments, the micronized selenium disulfide particles have a D90 of from about 1 to about 20 microns prior to mixing with the viscous carrier material. In some embodiments, the micronized selenium disulfide particles have a D90 of from about 5 to about 15 microns prior to mixing with the viscous carrier material. In some embodiments, the micronized selenium disulfide particles have a D90 of about 10 microns prior to mixing with the viscous carrier material.

The present disclosure provides a selenium disulfide composition comprising selenium disulfide particles mixed with a viscous carrier material, wherein the composition is essentially free of aggregated selenium disulfide particles. The present disclosure provides a selenium disulfide composition comprising selenium disulfide particles uniformly suspended in a viscous carrier material and wherein the composition maintains its uniformity after extended storage time. In some embodiments, the extended storage time is 12 months, 24 months, or 36 months.

The present disclosure provides a selenium disulfide composition comprising selenium disulfide particles mixed with a viscous carrier material, wherein the composition has a batch to batch variation of less than 15% (e.g., wt. %) (e.g., less than 10%, less than 5%, less than 3%, less than 1%, or the like) based on content of selenium disulfide (e.g., wherein the amount of selenium disulfide is about 85% to about 115% on a batch-to-batch basis, such as relative to an average content of the batches). In some embodiments, the batch to batch variation is based on at least 10 consecutive samples. In some embodiments, the dose-to-dose variation is based on consecutive samples of 20 grams per sample.

Thus, as described in various iterations herein, compositions provided herein, such as according to a process provided herein, have physical stability (e.g., as evidenced by the particle size parameters of the active). In some embodiments, compositions are (e.g., additionally or alternatively) chemically stable. In some embodiments, less than 10% (e.g., by wt.) (e.g., less than 5%, less than 3%, less than 2%, or less than 1%) of the selenium disulfide is chemically degraded, such as over time, such as during storage (e.g., for least 3 months, at least 6 months, at least 12 months, or the like). In some embodiments, a composition provided herein comprises less than 10 ppm (e.g., about 5 ppm or less) soluble impurities (e.g., selenium and/or sulfur based soluble impurities). In certain embodiments, the active (selenium disulfide) is chemically stable during a processing technique, such as described herein. In some embodiments, less than 10% (e.g., by wt.) (e.g., less than 5%, less than 3%, less than 2%, or less than 1%) of the selenium disulfide is chemically degraded during processing.

The present disclosure provides a selenium disulfide composition comprising selenium disulfide particles mixed with a viscous carrier material, wherein the composition does not exhibit substantial discoloration after extended storage time. The present disclosure provides a selenium disulfide composition comprising selenium disulfide particles mixed with a viscous carrier material, wherein less than 5% of the selenium disulfide is degraded after extended storage time. In some embodiments, the extended storage time is at least 36 months. In some embodiments, the extended storage time is at least 24 months. In some embodiments, the extended storage time is at least 12 months. In some embodiments, the composition further comprises one or more excipients, and wherein the excipients are mixed with the selenium disulfide particles and the viscous carrier material. In some instances, the one or more excipients are susceptible to degradation at a temperature equal to or higher than the melting point of the viscous carrier material. In some instances, the one or more excipients are selected from mineral oil, caprylic or capric triglyceride, dimethicone, caprylic acid, isopropyl myristate, propylene glycol monolaurate, or propylene glycol monocaprylate. In some embodiments, the composition is essentially free of organic solvent. In some embodiments, the composition is essentially free of aqueous solvent. In some embodiments, the composition is essentially free of any preservative.

In some embodiments, $D_{90}$ of the selenium disulfide particles is 20 µm or less. In some embodiments, $D_{50}$ of the selenium disulfide particles is about 10 µm or less (e.g., 3-10 µm). In some embodiments, $D_{10}$ of the selenium disulfide particles is about 5 µm or less (e.g., about 3 µm to about 5 µm). In some embodiments, D99 of the selenium disulfide particles is about 50 µm or less (e.g., about 40 µm or less or about 30 µm or less).

In some embodiments of the composition or methods of described herein, the composition comprises from about 0.1% to about 10.0% of selenium disulfide by weight. In some embodiments of the composition or methods of described herein, the composition comprises from about 90.0% to about 99.9% of the viscous carrier material by weight.

In certain embodiments, provided herein is a method of filling a composition comprising petrolatum into a dispenser by maintaining the temperature of the composition below the melting point of petrolatum during the filling. In some embodiments, filling is completed by a piston filling machine. In some embodiments, the dispenser is a laminated tube. In some embodiments, the dispenser is purged with nitrogen prior to filling. In some embodiments, the dispenser is heat-sealed after filling. In some embodiments, the method further comprises a step of sterilizing the composition by gamma irradiation. In some embodiments, the petrolatum has a density of no more than 850 Kg/m$^3$.

DETAILED DESCRIPTION OF THE INVENTION

Described herein are methods for the manufacture of compositions useful for treating disorders in or around the eye, such as meibomian gland dysfunction (MGD). In some embodiments, compositions provided herein comprise (e.g., anhydrous) selenium disulfide (SeS$_2$), such as wherein the SeS$_2$ is uniformly dispersed in an (e.g., anhydrous) vehicle in a non-aggregated manner and the dispersion of SeS$_2$ is stable (e.g., physically and chemically), such as without use of surfactants, suspending agents or dispersing agents. In certain embodiments, the compositions are useful for the treatment of MGD, such as disclosed in U.S. Pat. No. 9,463,201 and/or WO 2017/178892.

In some instances, contacting SeS$_2$ with aqueous medium causes immediate and spontaneous aggregation, such that SeS$_2$ particles with an average size of 5 to 10 microns will form large aggregates of 50 to 500 microns average size. SeS$_2$ in marketed products (e.g., Sebosel™) is present in such aggregates. Surfactants and various suspending agents are required to stabilize SeS$_2$ suspension in liquid and semi-solid dosage forms in order to enable its topical application. In certain instances, aggregation of particles within a composition or formulation, such as for ophthalmic use, is disadvantageous for any one of a number of reasons, such as providing non-uniform delivery of active (e.g., reducing therapeutic efficacy), reducing shelf life (e.g., by accelerating aggregation over time, leading to reduced efficacy after a shorter time period), and/or the like.

Major problems related to ophthalmic compositions are crystallization and agglomeration of active ingredients during preparation as well as during storage. In certain instances, unwanted crystallization or agglomeration of active pharmaceutical ingredient (API) leads to non-uniformity of dose, difficulty of administration, irritation to eye due to large drug particles and/or any ocular adverse effect due to high drug concentration or failure of treatment due to low drug concentration. Where the ophthalmic formulations are prepared as suspension, it is desirable to prepare the suspension in a manner such that the suspended particles do not agglomerate into larger ones upon storage. A particle size above 10 µm in diameter in an ophthalmic composition may result in a foreign body sensation in the eye following ocular application, causing reflex tearing. A reduction in particle size generally improves the patient comfort and acceptability of ophthalmic formulations. In addition, reduced particle size will increase the contact area between the selenium disulfide particles and the orifice of the meibomian gland thus increase the effectiveness of the formulation.

Moreover, in certain instances, selenium disulfide has a tendency to degrade over time, such as upon prolonged storage. In some instances, the degradation products have undesirable properties, such as increased toxicity. In certain instances, compositions provided herein have improved chemical stability compared to currently marketed products. This improved stability is particularly important for ophthalmic applications since the ocular surface is more sensitive than the skin to SeS$_2$ degradation products. It has been observed that SeS$_2$ aqueous suspensions change color from orange to brown/gray or black colors at accelerated temperature conditions. For example, such discoloration may indicate chemical degradation of the SeS$_2$ cyclic ring structure. In some instances, compositions provided herein (e.g., anhydrous and surfactant free formulation) does not degrade at the rate of the currently available SeS$_2$ compositions and is therefore much more suitable for ophthalmic use.

Pharmaceutically (e.g., ophthalmically) suitable compositions (e.g., anhydrous and surfactant free formulation of SeS$_2$) in a viscous carrier material is challenging to manufacture on bulk scale. In some instances, the technical problem to be solved is the lack of availability of manufacturing methods of suitable compositions comprising uniform active distribution, low degree of active aggregation, and/or low degree of active degradation, such as in a viscous carrier and/or ophthalmically suitable composition.

Any suitable viscous carrier may be used in a composition or method provided herein. In certain embodiments, the viscous carrier has a viscosity of at least 2,000 cP (e.g., at a temperature of 20 degree C.). In some embodiments, the viscosity (e.g., at 20 degree C.) is at least 5,000 cP, at least 10,000 cP, at least 25,000 cP, at least 50,000 cP, at least 60,000 cP, at least 70,000 cP, at least 80,000 cP, at least 90,000 cP, at least 100,000 cP, at least 200,000 cP, at least 300,000 cP, at least 400,000 cP, at least 500,000 cP, or the like.

Petrolatum (petroleum jelly) is used as a viscous carrier material in a wide variety of topical ointment and cream formulations. The rheological, or mechanical, properties of petrolatum are dependent on the quality and the source of the petrolatum. The melting point of petrolatum is typically about 60° C. Petrolatum has high viscosity, low flowing properties and low heat flow; therefore, in a manufacturing process, heating above the melting point (about 60° C.) to afford a flowing liquid allows usage in mixing vessels with low or high shear stirring heads. Elevated temperature is also used to facilitate the placement of petrolatum-based formulations into containers and packaging.

Figure 4:
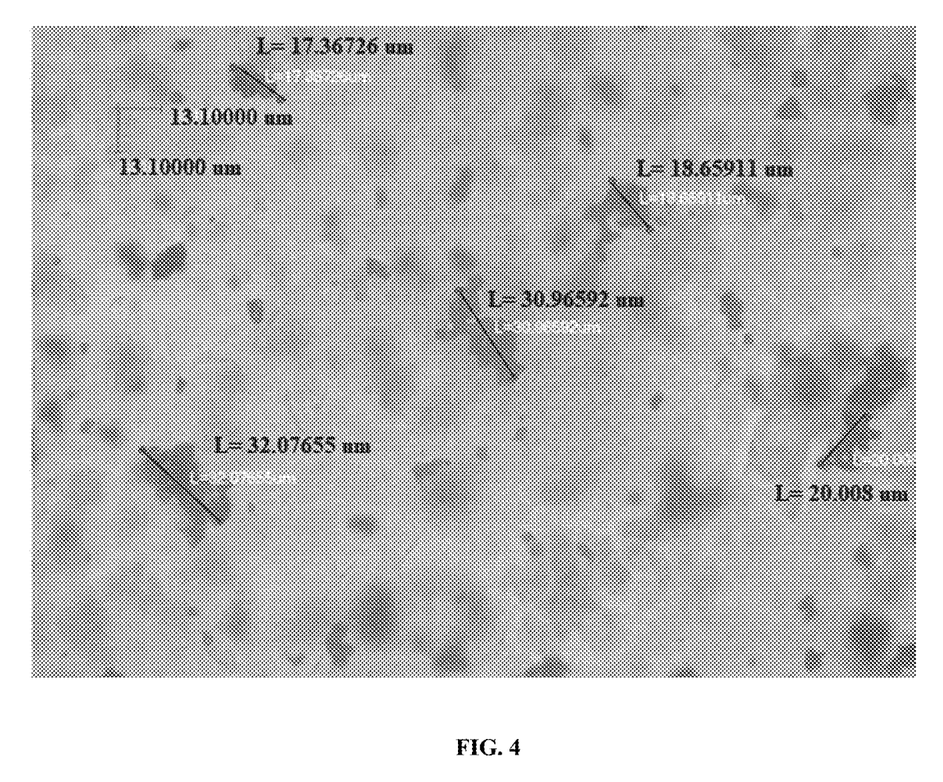
FIG. 4 illustrates SeS$_2$ formulation obtained mixing liquid petrolatum at a temperature of 60° C. with micronized SeS$_2$ at 400× microscope magnification showing the presence of SeS$_2$ particles larger than 25 microns.

Initial attempts to prepare a uniform dispersion of micronized $SeS_2$ in liquid petrolatum were unsuccessful. Mixing the $SeS_2$ with liquid petrolatum at temperatures of 60° C. and higher resulted in destabilization and/or degradation, as evidenced by discoloration to a black color (see FIG. 1), and particle formation over 25 microns, as evidenced by particle size analysis under a microscope (see FIG. 4). Thus, a new manufacturing process was desirable to avoid destabilization, degradation, and/or agglomeration.

It was unexpectedly discovered that the flowing properties of the petrolatum can be manipulated and create steady flow without heating the petrolatum above its melting point or congealing point, thus enabling a low temperature process to protect the active ingredients from degradation.

Figure 2:
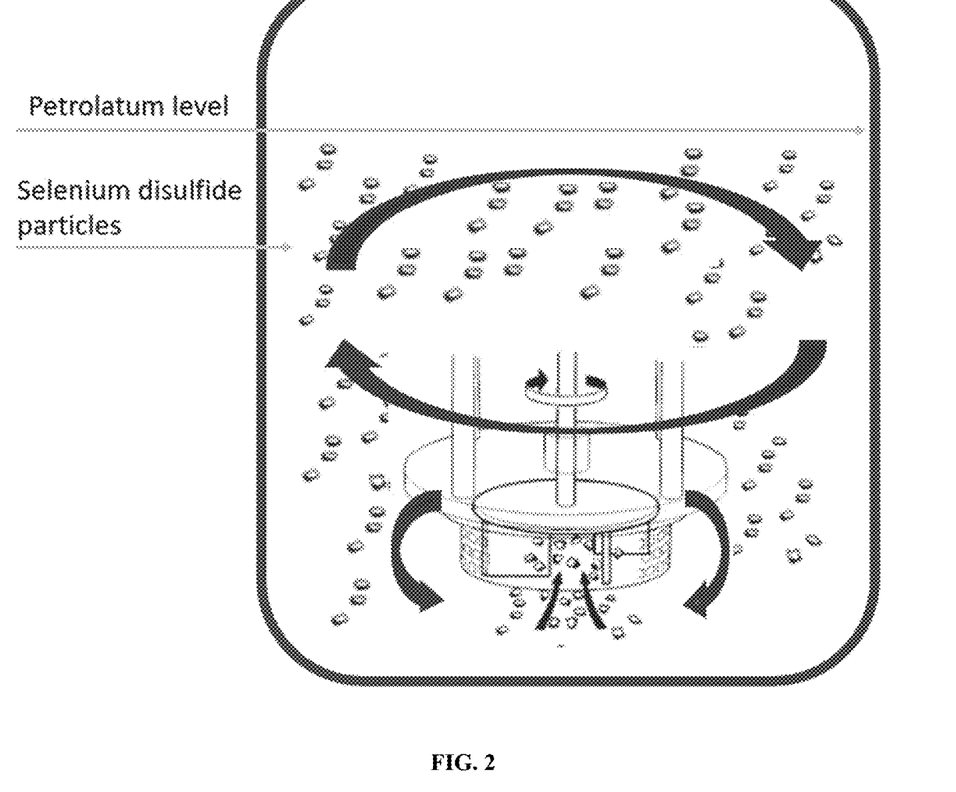
FIG. 2 illustrates the mixing process configuration comprising high shear mixing with low shear mixing element incorporated over the rotating axis.

The low temperature mixing process developed (see FIG. 2) involves acceleration of the petrolatum top to bottom using high shear mixing technique with preheating of the petrolatum in an incubator to only 40° C. in order to create steady flowing and mixing, and uniform heat transfer to all vessel parts. High shear mixing is performed in a gradient fashion, beginning in the upper portion of the vessel to accelerate the petrolatum and initiate flow. High shear mixing can comprise a tip speed ($U_T$) of 10 m/s or greater for a rotor stator type mixer. Mixing duration depends on bulk size (e.g., 15 minutes for 0.25 Kg, 2 hours for 15 Kg). Once steady flow has been established, the shear head is placed into the lower portion with an increase in speed of the mixer to maintain the vortex flow. An additional mixing element can be attached to the upper part of the mixing head axis as shown in FIG. 2. Once the high shear mixing head has been placed in the lower portion of the vessel, addition of the $SeS_2$ into the vortex can begin. During the cooling process, all excess air comes out of the final product.

Figure 1:
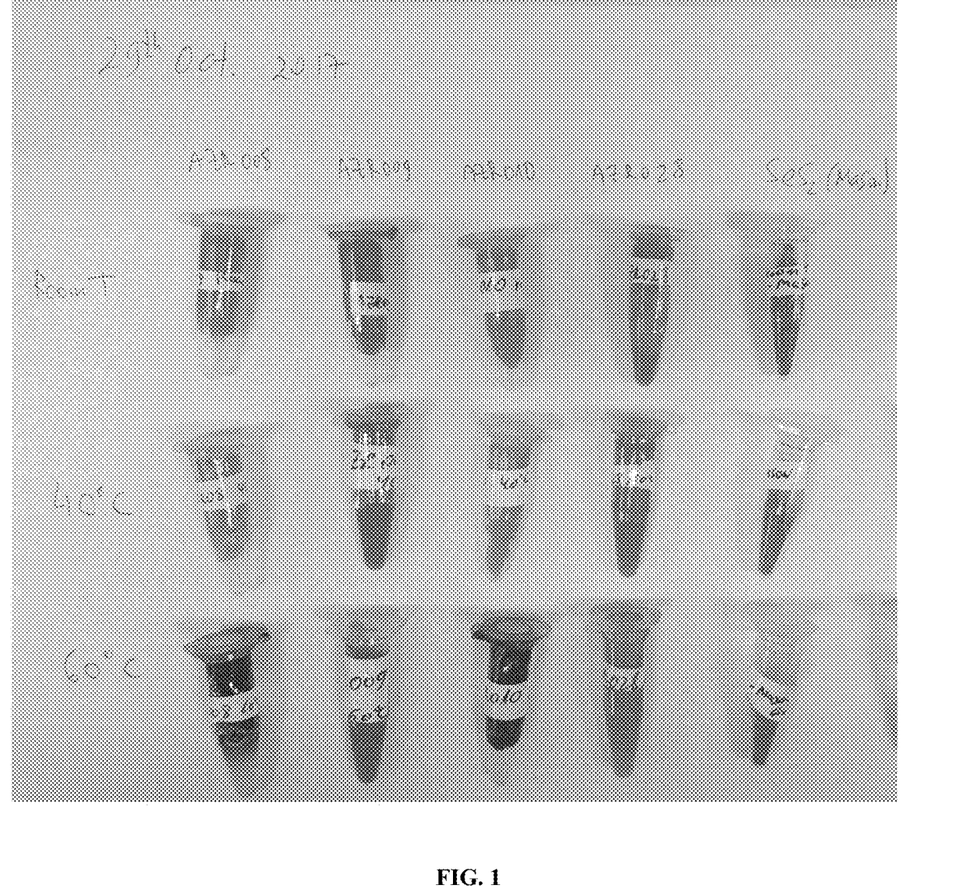
FIG. 1 illustrates four different formulations and one SeS$_2$ powder sample processed at 3 temperatures; the formulation processed at 40° C. is similar to the formulation processed at 25° C. The formulation processed at 60° C. turned black.

FIG. 1 provides a comparison between petrolatum formulations produced using the new low temperature process, the unacceptable high temperature process, and the small-scale room temperature process. The low temperature process provides material of improved, optimal, or maximum stabilization and/or minimal destabilization, degradation, and/or agglomeration.

Figure 3:
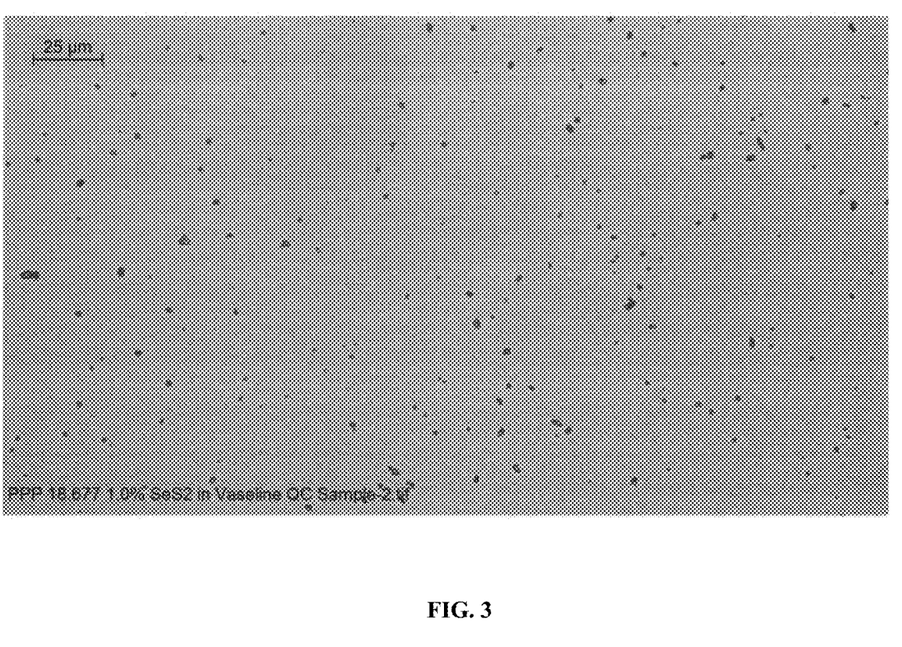
FIG. 3 illustrates a 1% SeS$_2$ (w/w) formulation obtained using the low temperature process at 400× microscope magnification showing uniform dispersion of the SeS$_2$ particles.

FIG. 3 illustrates a 1% $SeS_2$ (w/w) formulation obtained using the low temperature process. At 400x microscope magnification, the formulation provides a uniform dispersion of the $SeS_2$ particles having minimal increase in particle size or agglomeration.

Provided herein is a method of making a selenium disulfide composition, wherein the method comprises mixing selenium disulfide particles and a viscous carrier material to form a mixture, wherein the temperature of the mixture is below melting point of the viscous carrier material during the mixing.

Further provided herein is a method of making a selenium disulfide composition, wherein the method comprises mixing selenium disulfide particles and a viscous carrier material to form a mixture, wherein the temperature of the mixture is below congealing point of the viscous carrier material during the mixing.

Another embodiment provides a process for manufacturing a petrolatum base ointment formulation, the process comprising producing a (e.g., continuous) flow environment with a high shear mixing apparatus; and maintain the apparatus at a temperature below the melting point of the petrolatum base ointment.

In some instances, techniques and/or methods described in such formulations are also applicable to other formulations and compositions. For example, in some embodiments, high shear mixing (e.g., using a high shear homogenizer) is utilized to formulate a composition provided herein (e.g., comprising selenium disulfide and a carrier, such as a viscous carrier). In some embodiments, the composition or formulation is a gel, hydrogel, ointment, cream, lotion, spray, foam, strip, patch, implant (e.g., slow release, biodegradable, semi-degradable, or non-degradable), lipid base systems (e.g., solid lipid nano/micro particles, liposomes, exosome, micelles, micro/nano emulsions, cubosomes, cochleatses, niosomes, lipospheres), silica based system (e.g., mesoporous), polymer based system, nano and/or micro-spheres, nano- and/or micro-capsules, nano- and/or micro-particles, or the like.

In some instances, techniques and/or methods described in such formulations are also applicable to other formulations and compositions. For example, in some embodiments, high shear mixing (e.g., using a high shear homogenizer) is utilized to formulate a composition provided herein (e.g., comprising selenium disulfide and a carrier, such as a viscous carrier). In some embodiments, the composition or formulation has a viscosity at 20 degrees Celsius of at least 5,000 cP, at least 10,000 cP, at least 25,000 cP, at least 50,000 cP, at least 60,000 cP, at least 70,000 cP, at least 80,000 cP, at least 90,000 cP, at least 100,000 cP, at least 200,000 cP, at least 300,000 cP, at least 400,000 cP, at least 500,000 cP, or the like.

In certain embodiments, methods provided herein further comprise filling a container with the composition, such as in the case of a spray, a foam, a gel, an ointment, a lotion, or the like. In some embodiments, methods provided herein further comprising casting or otherwise forming a solid or semi-solid form, such as a strip, a patch, or the like. Table 1 illustrates exemplary compositions as well as various steps involved in the preparation thereof.

TABLE 1

| Formulation concepts/dosage forms | Manufacturing process |
| --- | --- |
| Gel | High Shear Homogenizer mixer, filling |
| Ointment | Heater, High Shear Homogenizer mixer, filling |
| Lotion | Heater, High Shear Homogenizer mixer, filling |
| Strip | High Shear Homogenizer mixer, film casting, dryer |

TABLE 1-continued

| Formulation concepts/dosage forms | Manufacturing process |
|---|---|
| Patch | High Shear Homogenizer mixer, film casting/creation, adhesion to rigid layer |
| Spray | High Shear Homogenizer mixer, filling |
| Foam | High Shear Homogenizer mixer, filling pressurized can |

In certain embodiments, other mixing techniques that achieve the results described herein are utilized. In some embodiments, a method provided herein comprises mixing a combination described herein using high shear mixing, high pressure mixing (e.g., high pressure homogenization), supercritical carbon dioxide (sCO2) mixing techniques, or a combination thereof. In some embodiments, exemplary mixing machines include rotor-stator (e.g., Silverson LSM, ESCO Processing plant), in line homogenizer (e.g. Silverson In-line), ultrasonic (e.g. Hielscher), bead mill (e.g. DYNO®-MILL), high-pressure (e.g. Microfluidizer, EMULSIFLEX, BERTOLI, Gaulin) colloidal mill (IKA MK Colloid Mill), jet milling (NETZSC, ESCO Jet mill), wet grinding (NETZSCH), or supercritical carbon dioxide.

In certain instances, methods provided herein involve mixing at a temperature that is low enough to avoid, minimize, or reduce degradation and/or aggregation. In some embodiments, such as discussed above, the maximum temperature is a temperature at which the carrier melts. In some embodiments, the maximum temperature at or below which the active (selenium disulfide) melts or degrades (or changes in color from yellow or orange to dark brown or black). In specific embodiments, the mixing temperature (or maximum mixing temperature) is about 106.5 degree Celsius or less. In an exemplary embodiment, (e.g., in an embodiment of strip or patch manufacturing, such as depending on polymer utilized), the mixing temperature is about 90° C. or less, about 80° C. or less, or the like. In some instances, different polymers are in semi solid/semi liquid state. In some embodiments, such as in certain instances of lipid particle manufacturing, temperature limitation is per lipid solubility. In certain embodiments, mixing temperature is up to 70 degree Celsius (sometimes more with complex synthetic lipids)

In certain embodiments, the temperature of the mixture is or is being maintained below about 55 degree Celsius during mixing, at least about 15 to about 20 degree Celsius during mixing, least about 15 to about 20 degree Celsius during mixing, from about 20 to about 25 degree Celsius during mixing, from about 25 to about 55 degree Celsius during mixing, from about 30 to about 50 degree Celsius during mixing, from about 35 to about 45 degree Celsius during mixing, or 40 degree Celsius during mixing. In certain embodiments, the temperature of the mixture varies during the mixing. Alternatively, in certain embodiments, the temperature of the mixture remains constant during the mixing. In certain embodiments, the temperature of the mixing is or is maintained below about 55 degrees Celsius, about 50 degrees Celsius, about 45 degrees Celsius, about 40 degrees Celsius, about 35 degrees Celsius, about 30 degrees Celsius, about 25 degrees Celsius, or about 20 degrees Celsius.

In certain embodiments, the viscous carrier material has a steady flow pattern during the mixing. In certain embodiments, the viscous carrier material has a steady flow pattern prior to the mixing. In some instances, the steady flow pattern is a vortex flow with downward acceleration along a center axis. In certain embodiments, the mixture is subject to high shear during mixing.

In certain embodiments, techniques to avoid, reduce, or minimize selenium sulfide aggregation is by using a high-shear homogenizer, such as that can be used for several dosage forms (examples in the table herein). In some embodiments, compositions or formulations provided herein are prepared utilizing using any suitable process, equipment or materials, such as by way of non-limiting example, high pressure homogenizer (foam, lipids, etc.) and/or supercritical carbon dioxide, such as to facilitate creating a homogeneous dosage form.

Thus, in certain embodiments, the vortex flow is created by high-shear, by high-shear Rotor-Stator mixer, by high-shear impeller or saw tooth impeller, by high-shear jet mixer, and/or by initial high-shear mixing and maintained with addition of low-shear mixing or propeller mixing. In some instances, air bubbles are drawn into the steady flow pattern of the carrier material. In some instances, the air bubbles modify the rheological properties of the viscous carrier material. In some instances, the air is released after the mixture is formed.

Any suitable shear or shear rate is utilized in a process herein. In specific embodiments, such as described herein, high shear mixing and/or apparatus is utilized. In some embodiments, high shear is achieved by using a tip speed ($U_T$) of at least 10 m/s. In some instances, high shear apparatus, such as described herein, provides high shear at any suitable rpm (e.g., in a high shear rotary mixer or apparatus, such as described herein), such as at least 500 rpm, at least 1,000 rpm, at least 2,000 rpm, at least 3,000 rpm, at least 4,000 rpm, at least 5,000 rpm, at least 6,000 rpm, or the like. In some instances, any suitable shear rate is utilized to achieve a high shear, such as a shear rate of at least 10 s$^{-1}$, at least 50 s$^{-1}$, at least 100 s$^{-1}$, at least 1,000 s$^{-1}$, at least 3,000 s$^{-1}$, or the like.

In some embodiments, the carrier material is pre-heated to a temperature below its melting point before the steady flow pattern is formed. Alternatively, the carrier material is petrolatum and is pre-heated to about 40 degree Celsius before the steady flow pattern is achieved.

In some embodiments, the selenium disulfide particles are added to the steady flow pattern of the viscous carrier material at a rate from 0.01 g/min to 1.5 g/min per 1 Kg of bulk product. In some instances, the mixing continues until the selenium disulfide particles are uniformly suspended in the carrier material. Alternatively, and/or additionally, the mixing continues for at least until homogeneous bulk is obtained.

In certain embodiments, the mixture is further allowed to cool down while mixing continues. In some embodiments, the mixture or composition is cooled to about 30 degree Celsius while mixing continues. In some embodiments, the mixture or composition is cooled to about room temperature while mixing continues.

In certain embodiments, the mixture or composition is filled to a dispenser while mixture is in its semi-solid state. In some embodiments, filling is completed by a piston filling machine. In some embodiments, the dispenser is a laminated tube. In some embodiments, the dispenser is purged with nitrogen prior to filling and it is heat-sealed after filling. In some instances, the composition is sterilized by gamma irradiation.

In some embodiments, the selenium disulfide particles are micronized (e.g., prior to mixing with the viscous carrier material. In some embodiments, the micronized selenium disulfide particles have an average particles size of no more than about 25 μm prior to mixing with the viscous carrier material. In some embodiments, the micronized selenium disulfide particles have a $D_{90}$ of from about 1 to about 20 μm prior to mixing with the viscous carrier material. In some embodiments, the micronized selenium disulfide particles have a $D_{90}$ of from about 5 to about 15 μm prior to mixing with the viscous carrier material. In some embodiments, the selenium disulfide particles have a $D_{90}$ of about 8-10 μm prior to mixing with the viscous carrier material. In some embodiments, the selenium disulfide particles have a $D_{99}$ of about 10-15 (e.g., about 11-12) μm prior to mixing with the viscous carrier material. In some embodiments, the selenium disulfide particles have a $D_{50}$ of about 3-7 (e.g., about 4-6, or about 5) μm prior to mixing with the viscous carrier material. In some embodiments, $D_{90}$ of the selenium disulfide particles is 20 μm or less, following mixing. In some embodiments, $D_{50}$ of the selenium disulfide particles is about 10 μm or less (e.g., 3-10 μm), following mixing. In some embodiments, $D_{10}$ of the selenium disulfide particles is about 5 μm or less (e.g., about 3 μm to about 5 μm), following mixing. In some embodiments, $D_{99}$ of the selenium disulfide particles is about 50 μm or less (e.g., about 40 μm or less or about 30 μm or less), following mixing.

In some embodiments, the composition is essentially free of aggregated selenium disulfide particles. In some embodiments, the selenium disulfide particles are uniformly suspended in the carrier material in the composition. In some embodiments, the composition maintains uniformity after extended storage time for at least 12 months. In some embodiments, the composition has a batch to batch variation of less than 1% based on content of selenium disulfide. In some embodiments, the batch to batch variation is based on 10 consecutive samples. In some embodiments, the batch to batch variation is based on consecutive samples of 20 gram per sample. In some embodiments, the composition does not exhibit visually substantial discoloration after extended storage time. In some embodiments, less than 5 wt. % of the selenium disulfide is degraded after extended storage time for at least 36 months. In some embodiments, the extended storage time is 24 months. In some embodiments, the extended storage time is 18 months. In some embodiments, the extended storage time is 12 months.

In certain embodiments, the composition further comprises one or more excipients, and wherein the excipients are mixed with the selenium disulfide particles and the viscous carrier material. In such embodiments, in some instances, the one or more excipients are susceptible to degradation at a temperature equal to or higher than the melting point of the viscous carrier material. In some instances, one or more excipients are selected from mineral oil, caprylic triglyceride, capric triglyceride, dimethicone, caprylic acid, isopropyl myristate, propylene glycol monolaurate, propylene glycol monocaprylate, or a penetration enhancer.

In some embodiments, the composition is essentially free of organic solvent. In some embodiments, the composition is essentially free of aqueous solvent. In some embodiments, the composition is essentially free of any preservative.

The present disclosure provides a selenium disulfide composition comprising micronized selenium disulfide particles mixed with a viscous carrier material, wherein the micronized selenium disulfide particles have an average particles size of no more than about 25 microns, about 20 microns, about 15 microns, about 10 microns, about 5 microns, or about 1 micron. In some embodiments, the micronized selenium disulfide particles have a D90 of from about 1 to about 20 microns prior to mixing with the viscous carrier material. In some embodiments, the micronized selenium disulfide particles have a $D_{90}$ of from about 5 to about 15 microns prior to mixing with the viscous carrier material. In some embodiments, the micronized selenium disulfide particles have a $D_{90}$ of about 10 microns prior to mixing with the viscous carrier material.

The present disclosure provides a selenium disulfide composition comprising selenium disulfide particles mixed with a viscous carrier material, wherein the composition is essentially free of aggregated selenium disulfide particles. The present disclosure provides a selenium disulfide composition comprising selenium disulfide particles uniformly suspended in a viscous carrier material and wherein the composition maintains its uniformity after extended storage time. In some embodiments, the extended storage time is 12 months, 24 months, or 36 months.

The present disclosure provides a selenium disulfide composition comprising selenium disulfide particles mixed with a viscous carrier material, wherein the composition has a batch to batch variation of less than 1 wt. % based on content of selenium disulfide. In some embodiments, the batch to batch variation is based on 10 consecutive samples. In some embodiments, the dose-to-dose variation is based on consecutive samples of 20 grams per sample.

The present disclosure provides a selenium disulfide composition comprising selenium disulfide particles mixed with a viscous carrier material, wherein the composition does not exhibit substantial discoloration after extended storage time. The present disclosure provides a selenium disulfide composition comprising selenium disulfide particles mixed with a viscous carrier material, wherein less than 5 wt. % of the selenium disulfide is degraded after extended storage time. In some embodiments, the extended storage time is at least 36 months. In some embodiments, the extended storage time is at least 24 months. In some embodiments, the extended storage time is at least 12 months. In some embodiments, the composition further comprises one or more excipients, and wherein the excipients are mixed with the selenium disulfide particles and the viscous carrier material. In some instances, the one or more excipients are susceptible to degradation at a temperature equal to or higher than the melting point of the viscous carrier material. In some instances, the one or more excipients are selected from mineral oil, caprylic or capric triglyceride, dimethicone, caprylic acid, isopropyl myristate, propylene glycol monolaurate, or propylene glycol monocaprylate. In some embodiments, the composition is essentially free of organic solvent. In some embodiments, the composition is essentially free of aqueous solvent. In some embodiments, the composition is essentially free of any preservative.

In some embodiments, $D_{90}$ of the selenium disulfide particles is 20 μm or less. In some embodiments, $D_{50}$ of the selenium disulfide particles is about 10 μm or less (e.g., 3-10 μm). In some embodiments, $D_{10}$ of the selenium disulfide particles is about 5 μm or less (e.g., about 3 μm to about 5 μm). In some embodiments, $D_{99}$ of the selenium disulfide particles is about 50 μm or less (e.g., about 40 μm or less or about 30 μm or less).

In some embodiments of the composition or methods of described herein, the composition comprises from about 0.1% to about 10.0% of selenium disulfide by weight. In some embodiments of the composition or methods of described herein, the composition comprises from about 90.0% to about 99.9% of the viscous carrier material by weight.

The present disclosure provides a method of filling a composition comprising petrolatum into a dispenser by maintaining the temperature of the composition below the melting point of petrolatum during the filling. In certain embodiments, filling is completed by a piston filling machine. In some embodiments, the dispenser is a laminated tube. In some embodiments, the dispenser is purged with nitrogen prior to filling. In certain embodiments, the dispenser is heat-sealed after filling. In certain embodiments, the method further comprises a step of sterilizing the composition by gamma irradiation. In some embodiments, the petrolatum has a density of no more than 850 Kg/m$^3$.

Low Temperature Process for Preparing Petrolatum Formulations

The low temperature process disclosed herein has several advantages over alternate processes. As the process provided in certain embodiments herein is conducted at low temperatures, the SeS$_2$ is found to undergo little to no decomposition or degradation. The process allows flexibility in that additional additives or ingredients that are temperature sensitive and suffer degradation can be utilized in the formulation (e.g., small peptides (Glatiramer acetate), antibiotics (amoxicillin), metal oxides, plant extracts (Sea buckthorn oil), phenols (L-Dopa, levothyroxine) etc.). The low heat and steady flow process results in a shorter cooling step which enables better uniformity and homogeneity of final bulk material.

Petrolatum has two different flow patterns at the same temperature with the same shear head level when mixing with high shear mixing element, the first pattern being with no apparent flow, and the second pattern being a steady vortex flow. Transition from the first flow pattern to the second flow pattern is due to a change in petrolatum rheology that occurs after rough mixing using high shear element that incorporates air in the petrolatum and change the petrolatum elastic properties. The jets emerging from the head holes agitate the medium and, since the head operates constantly and the rotation of the rotor is responsible for the existence of a negative pressure differential, a flow in the shape of flow loops is formed. Cooling from 40° C. to 30° C. is done while mixing to ensure bulk uniformity and homogeneity, and during the cooling process the air bubbles entrapped in the petrolatum will disappear spontaneously resulting in defoaming.

The pharmaceutical dosage filling step of the bulk formulation is done using a semi-automated piston filling machine at ambient temperature. Typically, the filling process is into laminated tubes, such as to avoid contact between the active (selenium disulfide) and tube components (e.g., metals, such as aluminum) (e.g., to avoid or reduce the risk of direct contact of the active with a component that may destabilize the active, such as through chemical reaction). Sealing with a heating clamp is done after nitrogen purge. Terminal sterilization is done using gamma irradiation.

Methods for the Manufacture of Stable Selenium Disulfide Formulations

Described herein in some embodiments are methods for the manufacture of stable (e.g., anhydrous) formulations of selenium disulfide which are chemically stable, substantially free of aggregates and agglomerates. In some embodiments, the methods for the manufacture of stable (e.g., anhydrous) selenium disulfide formulations described herein are substantially free of surfactants. In some embodiments, the methods for the manufacture of stable (e.g., anhydrous) selenium disulfide formulations described herein are substantially free of dispersing agents. In some embodiments, the methods for the manufacture of stable (e.g., anhydrous) selenium disulfide formulations described herein, contain about 0.05 wt. % to about 5 wt. % selenium disulfide. In some embodiments, the methods for the manufacture of stable (e.g., anhydrous) selenium disulfide formulations described herein, contain about 2.5 wt. % selenium disulfide. In some embodiments, the methods for the manufacture of stable (e.g., anhydrous) selenium disulfide formulations described herein, contain about 0.01 wt. % to about 10 wt. % selenium disulfide. In some embodiments, the methods for the manufacture of stable (e.g., anhydrous) selenium disulfide formulations described herein, contain about 0.01 wt. % selenium disulfide. In some embodiments, the methods for the manufacture of stable (e.g., anhydrous) selenium disulfide formulations described herein, contain about 0.05 wt. % selenium disulfide. In some embodiments, the methods for the manufacture of stable (e.g., anhydrous) selenium disulfide formulations described herein, contain about 0.1 wt. % selenium disulfide. In some embodiments, the methods for the manufacture of stable (e.g., anhydrous) selenium disulfide formulations described herein, contain about 0.5 wt. % selenium disulfide. In some embodiments, the methods for the manufacture of stable (e.g., anhydrous) selenium disulfide formulations described herein, contain about 1.0 wt. % selenium disulfide. In some embodiments, the methods for the manufacture of stable (e.g., anhydrous) selenium disulfide formulations described herein, contain about 1.5 wt. % selenium disulfide. In some embodiments, the methods for the manufacture of stable (e.g., anhydrous) selenium disulfide formulations described herein, contain about 2.0 wt. % selenium disulfide. In some embodiments, the methods for the manufacture of stable (e.g., anhydrous) selenium disulfide formulations described herein, contain about 2.5 wt. % selenium disulfide. In some embodiments, the methods for the manufacture of stable (e.g., anhydrous) selenium disulfide formulations described herein, contain about 3.0 wt. % selenium disulfide. In some embodiments, the methods for the manufacture of stable (e.g., anhydrous) selenium disulfide formulations described herein, contain about 3.5 wt. % selenium disulfide. In some embodiments, the methods for the manufacture of stable (e.g., anhydrous) selenium disulfide formulations described herein, contain about 4.0 wt. % selenium disulfide. In some embodiments, the methods for the manufacture of stable (e.g., anhydrous) selenium disulfide formulations described herein, contain about 4.5 wt. % selenium disulfide. In some embodiments, the methods for the manufacture of stable (e.g., anhydrous) selenium disulfide formulations described herein, contain about 5.0 wt. % selenium disulfide. In some embodiments, the methods for the manufacture of stable (e.g., anhydrous) selenium disulfide formulations described herein, contain about 5.5 wt. % selenium disulfide. In some embodiments, the methods for the manufacture of stable (e.g., anhydrous) selenium disulfide formulations described herein, contain about 6.0 wt. % selenium disulfide. In some embodiments, the methods for the manufacture of stable (e.g., anhydrous) selenium disulfide formulations described herein, contain about 6.5 wt. % selenium disulfide. In some embodiments, the methods for the manufacture of stable (e.g., anhydrous) selenium disulfide formulations described herein, contain about 7.0 wt. % selenium disulfide. In some embodiments, the methods for the manufacture of stable (e.g., anhydrous) selenium disulfide formulations described herein, contain about 7.5 wt. % selenium disulfide. In some embodiments, the methods for the manufacture of stable (e.g., anhydrous) selenium disulfide formulations described herein, contain about 8.0 wt. % selenium disulfide. In some embodiments, the methods for the manufacture of stable (e.g., anhydrous) selenium disulfide formulations described herein, contain about 8.5 wt. % selenium disulfide. In some embodiments, the methods for the manufacture of stable (e.g., anhydrous) selenium disulfide formulations described herein, contain about 9.0 wt. % selenium disulfide. In some embodiments, the methods for the manufacture of stable (e.g., anhydrous) selenium disulfide formulations described herein, contain about 9.5 wt. % selenium disulfide. In some embodiments, the methods for the manufacture of stable (e.g., anhydrous) selenium disulfide formulations described herein, contain about 10.0 wt. % selenium disulfide.

In some embodiments, the (e.g., anhydrous) semi-solid base subject to the methods for the manufacture described herein is an oleaginous base. Exemplary oleaginous bases, for the stable (e.g., anhydrous) selenium disulfide formulations described herein include petroleum base, mineral oil, a mixture of mineral oil and white petroleum, vegetable oil, or petroleum jelly (Vaseline®). In some embodiments, the vegetable oil is chosen from coconut oil, fractionated coconut oil, jojoba oil, olive oil, sunflower oil, almond oil, cod liver oil, castor oil or virgin wax.

Preventing leakage of selenium disulfide from the eye lids to the ocular surface is desirable since its target organ, the meibomian gland and its orifices can only be reached from the lid edge and thus any spillage of the drug into the fornix' and onto the ocular surface reduces its effectiveness. Furthermore, avoiding leakage of selenium disulfide onto the aqueous ocular surface is desired so it does not aggregate and create large particles that can cause discomfort. In some embodiments, the methods for the manufacture is applied to a formulation having a specific melting point to allow stable and persistent presence of the ointment over the eyelid with minimal leak onto the ocular surface, yet, enables its penetration to the meibomian orifices, as well as liquefaction of the natural meibum lipids. Described herein, in some embodiments, is the method of manufacturing an ointment composition which is semi-solid at room temperature and has melting temperature between 33° C. to 36° C. In some embodiments is provided the method of manufacturing an ointment composition which is semi-solid at room temperature and has melting temperature between 33° C. to 46° C. In some embodiments is provided the method of manufacturing an ointment composition which is semi-solid at room temperature and has melting temperature between 33° C. to 38° C. In some embodiments is provided the method of manufacturing an ointment composition which is semi-solid at room temperature and has melting temperature between 33° C. to 40° C. In some embodiments is provided the method of manufacturing an ointment composition which is semi-solid at room temperature and has melting temperature between 33° C. to 42° C. In some embodiments is provided the method of manufacturing an ointment composition which is semi-solid at room temperature and has melting temperature between 33° C. to 44° C. In some embodiments is provided the method of manufacturing an ointment composition which is semi-solid at room temperature and has melting temperature between 34° C. to 37° C. In some embodiments is provided the method of manufacturing an ointment composition which is semi-solid at room temperature and has melting temperature between 35° C. to 38° C. In some embodiments is provided the method of manufacturing an ointment composition which is semi-solid at room temperature and has melting temperature between 32° C. to 40° C. In some embodiments is provided the method of manufacturing an ointment composition which is semi-solid at room temperature and has melting temperature between 33° C. to 56° C., wherein the composition releases squalene or other liquid lipids upon contact with eyelid margin. In some embodiments is the method of manufacturing a formulation that has a melting point that is higher than the temperature of the ocular surface which is about 34° C. so it does not liquefy when it comes in contact with the ocular surface but below 37° C. so it can penetrate the meibomian gland orifices.

In some embodiments is provided the method of manufacturing a stable (e.g., anhydrous) selenium disulfide formulation substantially free of agglomerates. In some embodiments, substantially free of agglomerates means that the average selenium disulfide particle diameter throughout the formulation is less than about 50 µm, less than about 45 µm, less than about 40 µm, less than about 35 µm, less than about 30 µm, less than about 25 µm, less than about 20 µm, less than about 15 µm, less than about 10 µm, less than about 9 µm, less than about 8 µm, less than about 7 µm, less than about 6 µm, or less than about 5 µm. In some embodiments, substantially free of agglomerates means that the average selenium disulfide particle diameter throughout the formulation is no more than about 50 µm, no more than about 45 µm, no more than about 40 µm, no more than about 35 µm, no more than about 30 µm, no more than about 25 µm, no more than about 20 µm, no more than about 15 µm, no more than about 10 µm, no more than about 9 µm, no more than about 8 µm, no more than about 7 µm, no more than about 6 µm, or no more than about 5 µm. In some embodiments, substantially free of agglomerates means that the average selenium disulfide particle diameter throughout the formulation is between about 5 µm and about 10 µm, or between about 5 µm and about 15 µm, or between about 10 µm and about 20 µm, or between about 5 µm and about 20 µm, or between about 15 µm and about 25 µm.

In certain embodiments, at least 90% of the active (selenium disulfide) particles are about 20 µm or less. In specific embodiments, 90% of the active (selenium disulfide) particles are 20 µm or less (i.e., the $D_{90}$ is 20 µm or less) (e.g., wherein up to 10% of the active particles have a particle size up greater than 20 µm). In some embodiments, at least 50% of the active (selenium disulfide) particles are about 10 µm or less. In specific embodiments, 50% of the active (selenium disulfide) particles are 10 µm or less (i.e., the $D_{50}$ is 10 µm or less) (e.g., wherein up to 50% of the active particles have a particle size up greater than 10 µm). In certain embodiments, 10% (or less) of the active (selenium disulfide) particles are 5 µm or less (e.g., the $D_{10}$ is about 5 µm or less, such as wherein the $D_{10}$ is about 1 µm to about 5 µm, e.g., about 3 µm to about 5 µm).

In some embodiments, $D_{95}$ of the active particles is about 50 µm or less, about 40 µm or less, about 30 µm or less, about 20 µm or less, or about 30 µm or less. In some embodiments, $D_{98}$ of the active particles is about 50 µm or less, about 40 µm or less, about 30 µm or less, about 20 µm or less, or about 30 µm or less. In some embodiments, $D_{99}$ of the active particles is about 50 µm or less, about 40 µm or less, about 30 µm or less, about 20 µm or less, or about 30 µm or less.

In some embodiments, substantially free of agglomerates means that the selenium disulfide particle diameter increases no more than 10 times, no more than 9 times, no more than 8 times, no more than 7 times, no more than 6 times, no more than 5 times, no more than 4 times, no more than 3 times, no more than 2 times, or no more than 1.5 times upon formulation compared with the initial particle diameter.

In some embodiments is provided the method of manufacturing a stable (e.g., anhydrous) selenium disulfide formulation substantially free of agglomerate wherein substantially free of agglomerate means that the formulation does not contains any selenium disulfide agglomerate. In some embodiments, the method of manufacturing stable (e.g., anhydrous) selenium disulfide formulations described herein do not contain particles larger than 5 µm in diameter. In some embodiments, the stable (e.g., anhydrous) selenium disulfide formulations described herein do not contain particles larger than 10 µm in diameter. In some embodiments, the stable (e.g., anhydrous) selenium disulfide formulations described herein do not contain particles larger than 30 µm in diameter. In some embodiments, the stable (e.g., anhydrous) selenium disulfide formulations described herein do not contain particles larger than 10 µm in diameter and do not contain any surfactants and dispersing agents. In some embodiments, the stable (e.g., anhydrous) selenium disulfide formulations described herein is substantially free of surfactants and dispersing agents. In some embodiments, substantially free of surfactants and dispersing agents means that the formulation contains less than about 10 wt. % surfactants, dispersing agents, and combination thereof. In some embodiments, substantially free of surfactants and dispersing agents means that the formulation contains less than about 10 wt. %, less than about 9 wt. %, less than about 8%, less than about 7 wt. %, less than about 6 wt. %, less than about 5 wt. %, less than about 4 wt. %, less than about 3 wt. %, less than about 2.5 wt. %, less than about 2 wt. %, less than about 1.5 wt. %, less than about 1 wt. %, less than about 0.9 wt. %, less than about 0.8 wt. %, less than about 0.7 wt. %, less than about 0.6 wt. %, less than about 0.5 wt. %, less than about 0.5 wt. %, less than about 0.4 wt. %, less than about 0.3 wt. %, less than about 0.2 wt. %, or less than about 0.1 wt. % surfactants, dispersing agents, and combination thereof. In some embodiments, substantially free of surfactants and dispersing agents means that the formulation contains no more than about 10 wt. % surfactants, dispersing agents, and combination thereof. In some embodiments, substantially free of surfactants and dispersing agents means that the formulation contains no more than about 10 wt. %, no more than about 9 wt. %, no more than about 8 wt. %, no more than about 7 wt. %, no more than about 6 wt. %, no more than about 5 wt. %, no more than about 4 wt. %, no more than about 3 wt. %, no more than about 2.5 wt. %, no more than about 2 wt. %, no more than about 1.5 wt. %, no more than about 1 wt. %, no more than about 0.9 wt. %, no more than about 0.8 wt. %, no more than about 0.7 wt. %, no more than about 0.6 wt. %, no more than about 0.5 wt. %, no more than about 0.5 wt. %, no more than about 0.4 wt. %, no more than about 0.3 wt. %, no more than about 0.2 wt. %, or no more than about 0.1 wt. % surfactants, dispersing agents, and combination thereof. In some embodiments, substantially free of surfactants and dispersing agents means that the formulation does not contains any surfactants, dispersing agents, and combination thereof. In some embodiments, substantially free of surfactants and dispersing agents means that the formulation is free of surfactants, dispersing agents, and combination thereof.

In some embodiments, the method of manufacturing a stable (e.g., anhydrous) selenium disulfide formulation described herein yield a dispersion of selenium disulfide in an (e.g., anhydrous) semi-solid base. In some embodiments, the selenium disulfide is dispersed in the (e.g., anhydrous) base to form a homogenous dispersion without any large aggregates or clumps of particles.

Chemical and Storage Stability of Selenium Disulfide Dispersion in Semi-Solid Ophthalmic Base In some embodiments, the method of manufacturing described herein provides a stable (e.g., anhydrous) selenium disulfide formulation wherein the stability of the formulations is tested under accelerated stability conditions, at a temperature of less than 40° C., such as up to 30° C. for an extended storage period.

Stability of an ophthalmic formulation is determined by the extent of chemical degradation of the active ingredients via processes such as hydrolysis, oxidation, etc, during the period of storage.

Chemical Degradation is Characterized by Formation of Degradants

In some embodiments, the total amount of impurities or degradants in the stable (e.g., anhydrous) selenium disulfide formulations produced with the method of manufacturing described herein does not increase over time during storage period. In some embodiments, the total amount of degradants in the stable (e.g., anhydrous) formulations does not increase when the formulation is tested under accelerated stability conditions, at a temperature of less than 40° C., such as up to 30° C. for an extended storage period when in comparison to marketed $SeS_2$ drug products. Another embodiment provides the method of manufacturing a composition further comprising small amounts of degradants of selenium disulfide, and wherein the amount of the degradants does not increase above 1 wt. % of the total weight of the composition.

In some embodiments, the chemical stabilization of the stable (e.g., anhydrous) selenium disulfide formulations produced by the method of manufacturing described herein is attributed to the reduced water content of the formulations. In some embodiments, the chemical stabilization of the stable (e.g., anhydrous) selenium disulfide formulations produced by the method of manufacturing described herein is attributed to the (e.g., anhydrous) nature of the formulation.

In some embodiments, drug instability in pharmaceutical formulations is detected by a change in the physical appearance, color, odor, taste, or texture of the formulation. In some embodiments, the stable (e.g., anhydrous) selenium disulfide formulations produced by the method of manufacturing described herein do not exhibit any substantial change in color during a period of storage, under elevated temperatures. In some embodiments, the period of storage is two weeks at a temperature of about 30° C.

Melting Point of Stable Selenium Disulfide Formulations

In some embodiments, the stable (e.g., anhydrous) selenium disulfide formulations produced by the method of manufacturing described herein has a melting temperature between about 34° C. and about 50° C. In some embodiments, the stable (e.g., anhydrous) selenium disulfide formulations produced by the method of manufacturing described herein has a melting temperature of about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C. In some embodiments, the stable (e.g., anhydrous) selenium disulfide formulations produced by the method of manufacturing described herein has a melting temperature close to and above the temperature of eyelid margin. In some embodiments, the melting point of the stable (e.g., anhydrous) selenium disulfide formulations produced by the method of manufacturing described herein, increases the bioavailability and efficacy of selenium disulfide.

In some embodiment, the stable (e.g., anhydrous) selenium disulfide composition produced by the method of manufacturing described herein comprises a synthetic or natural anti-oxidant selected from, for example, tocopherol or Vitamin E, EDTA (ethylenediamine tetraacetate), butylated hydroxyl anisole, butylated hydroxyl toluene, glutathione, astaxanthin, lutein, lycopene, propyl gallate, rosmarinic acid or ascorbyl palmitate.

In certain embodiments, the composition is preservative and/or anti-microbial free (e.g., less than 0.1 wt. %, less than 0.01 wt. %, 0 wt. %, or the like). In some embodiments, the composition is sterile, such as achieved by exposing the composition to gamma radiation. In certain embodiments, the composition maintains sterility, when sealed, for up to at least 12 months, up to at least 18 months, up to at least 2 years, or the like. In some embodiments, the composition maintains sterility when a storage device (e.g., tube) holding such a composition is opened (e.g. and administered to a finger) on a daily basis for at least 2 weeks, at least 30 days, at least 2 months, or the like.

In some embodiments, the stable (e.g., anhydrous) selenium disulfide formulations produced by the method of manufacturing described herein are part of a semi-solid dosage form, such as an eye liner or a ointment product, that is convenient to apply and spread over the eye lid margin in a similar manner to cosmetic eye lid product, whereas a very small amount of drug product is applied directly and precisely on the eye lid margin.

Pharmaceutical Excipient

In other embodiments, the stable (e.g., anhydrous) selenium disulfide formulations produced by the method of manufacturing described herein are combined with a pharmaceutically suitable or acceptable carrier (e.g., a pharmaceutically suitable (or acceptable) excipient, physiologically suitable (or acceptable) excipient, or physiologically suitable (or acceptable) carrier). Exemplary excipients are described, for example, in *Remington: The Science and Practice of Pharmacy* (Gennaro, 21$^{st}$ Ed. Mack Pub. Co., Easton, PA (2005)).

In some embodiments, the stable (e.g., anhydrous) selenium disulfide formulations produced by the method of manufacturing described herein further comprise an oil. In some embodiments, the oil is chosen from a triglycerides, diglyceride, monoglycerides, acetylated lanolin alcohol, alkyl benzoate, an alkyl octanoate, almond oil, an unsaturated or polyunsaturated oil, apricot stone oil, arachidyl behenate, arachidyl propionate, avocado oil, barley oil, basil oil, beeswax, benzyl laurate, benzyl myristate, benzyl palmitate, bis (octyldodecyl stearoyl) dimer dilinoleate, borage seed oil, butyl myristate, butyl stearate, C12-C15 alkyl benzoate, C12-C15 alkyl octanoate, calendula oil, camphor oil, canelle nut tree oil, canola oil, capric/caprylic triglycerides, caprylic/capric triglyceride castor oil, caprylyl methicone, cardamom oil, carrot oil, castor oil, cetearyl ethylhexanoate, cetearyl isononanoate, cetearyl octanoate, cetyl acetate, cetyl dimethicone, cetyl ethylhexanoate, cetyl lactate, cetyl myristate, cetyl octanoate, cetyl palmitate, cetyl ricinoleate, citronella oil, clary sage oil, clove oil, cocoglycerides, coconut oil, cod-liver oil, corn oil, cotton oil, cottonseed oil, cyclohexasiloxane, cyclomethicone, cyclomethicone 5-NF (cyclopentasiloxane), cyclotetrasiloxane, cypress oil, decyl oleate, diethyleneglycol, diethylhexanoate, diethyleneglycol diisononanoate, diethyleneglycol dioctanoate, diethylhexanoate, diethylhexyl adipate, diethylhexyl malate, diethylhexyl succinate, diisopropyl adipate, diisopropyl dimerate, diisopropyl sebacate, diisosteary dimer dilinoleate, diisostearyl fumerate, dimethicone, dimethyl polysiloxane, dioctyl malate, dioctyl sebacate, disopropyl adipate, dodecyl oleate, cyclotetrasiloxane (Dow Corning 244 Fluid), cyclohexasiloxane/cyclopentasiloxane (Dow corning 246 Fluid (d6+d5)), epoxy-modified silicone oil, ester derivatives of lanolic acid, ethylhexyl cocoate, ethylhexyl ethylhexanoate, ethylhexyl hydroxystarate, ethylhexyl isononanoate, ethylhexyl palmitate, ethylhexyl palmytate, ethylhexyl pelargonate, ethylhexyl stearate, evening primrose oil, fatty acid-modified silicone oil, flaxseed oil, fluoro group-modified silicone oil, frankincense oil, gelled mineral oil, ginger oil, glycereth triacetate, glycerol triheptanoate, glyceryl oleate, glyceryl trioctanoate, glyceryl triundecanoate, grape seed oil, grapefruit oil, groundnut oil, hazelnut oil, heavy mineral oil, hempseed oil, herring oil, hexadecyl stearate, hexyl laurate, hydrocarbon oils, hydrogenated castor oil, hyssop oil, isoamyl laurate, isocetearyl octanoate, isocetyl behenate, isocetyl lanolate, isocetyl palmitate, isocetyl salicylate, isocetyl stearate, isocetyl stearoyl stearate, isodecyl ethylhexanoate, isodecyl isononanoate, isodecyl oleate, isododecane, isohexadecane isododecane, isohexadecanol, isohexyl decanoate, isononyl isononanoate, isononyl octanoate, isoparaffin, isopropyl isostearate, isopropyl lanolate, isopropyl laurate, isopropyl myristate, isopropyl palmitate, isopropyl stearate, isosteary citrate, isosteary salicylate, isosteary tartarate, isostearyl behenate, isostearyl erucate, isostearyl glycolate, isostearyl isononanoate, isostearyl isostearate, isostearyl lactate, isostearyl linoleate, isostearyl linolenate, isostearyl malate, isostearyl neopentanoate, isostearyl palmitate, isotridecyl isononanoate, jasmine oil, lauryl lactate, lavender oil, lemon oil, light mineral oil, liquid paraffin, liquid triglycerides, lucerne oil, maize germ oil, maleated soybean oil, mandarin oil, manuka oil, marjoram oil, marrow oil, MCT oil, methylphenylpolysiloxane, millet oil, mineral oil, myristyl lactate, myristyl myristate, myristyl neopentanoate, myristyl propionate, myrrh oil, neopentylglycol dicaprate, neopentylglycol dicaprylate/dicaprate, neroli oil, nutmeg oil, octyl palmitate, octyl stearate, octyldodecanol, octyldodecyl behenate, octyldodecyl hydroxystearate, octyldodecyl myristate, octyldodecyl stearoyl stearate, oils from animal origin, oils of plant origin, oleyl erucate, oleyl lactate, oleyl oleate, olive oil, dimethiconol, palm oil, passionflower oil, peanut oil, rapeseed oil, rosehip oil, rye oil, safflower oil, sage oil, salmon oil, sesame oil, shea butter, silicone oils, soya oil, soybean oil, stearyl caprate, stearyl dimethicone, stearyl heptanoate, stearyl propionate, sunflower oil, sweet almond oil, synthetic isoalkane, sysymbrium oil, syzigium aromaticum oil, tangerine oil, tea tree oil, therapeutic oils, tocopheryl acetate, tocopheryl linoleate, tridecyl ethylhexanoate, tridecyl isononanoate, triisocetyl citrate, unsaturated or polyunsaturated oils, vanilla oil, verbena oil, walnut oil, wheat germ glycerides, wheat germ oil, white petrolatum and mixtures thereof.

In some embodiments, the stable (e.g., anhydrous) selenium disulfide formulations produced by the methods of manufacturing described herein further comprise an oil chosen from caprylic acid triglyceride, isopropyl palmitate and isopropylpalmitate. In some embodiments, the stable (e.g., anhydrous) selenium disulfide formulations produced by the methods of manufacturing described herein further comprise caprylic acid triglyceride. In some embodiments, the stable (e.g., anhydrous) selenium disulfide formulations produced by the methods of manufacturing described herein further comprise mineral oil.

In some embodiments, the amount of mineral oil in the stable (e.g., anhydrous) selenium disulfide formulations produced by the methods of manufacturing described herein ranges from about 10% to about 97.5%. In some embodiments, the amount of caprylic acid triglyceride in the stable (e.g., anhydrous) selenium disulfide formulations produced by the methods of manufacturing described herein ranges from about 5% to about 50%.

In some embodiments, the amount of vaseline in the stable (e.g., anhydrous) selenium disulfide formulations produced by the methods of manufacturing described herein ranges from about 10% to about 97.5%. In some embodiments, the amount of waxes in the stable (e.g., anhydrous) selenium disulfide formulations produced by the methods of manufacturing described herein ranges from about 5% to about 50%.

In some embodiments, the stable (e.g., anhydrous) selenium disulfide formulations produced by the methods of manufacturing described herein, further comprise a silicone based excipient. In some embodiments, the silicone based excipient is chosen from dimethiconol, dimethicone, cyclopentasiloxane, decamethylcyclopentasiloxane, alkylmethyl siloxane copolyol, alkylmethyl siloxane and stearyltrimethylsilane or any silicone excipient blend suitable for the stable (e.g., anhydrous) selenium disulfide formulations according to the embodiments provided herein. In some embodiments, the silicone based excipient is dimethicone. In some embodiments, the silicone based excipient is stearyltrimethylsilane and stearyl alcohol.

In some embodiments, the stable (e.g., anhydrous) selenium disulfide formulations produced by the methods of manufacturing described herein further comprise a cellulose-derived solidifying agent. In some embodiments the cellulose-derived solidifying agent is microfibrillated cellulose. In some embodiments the cellulose-derived solidifying agent is nanocrystalline cellulose.

In some embodiments, the stable (e.g., anhydrous) selenium disulfide formulations produced by the methods of manufacturing described herein, further comprise a solidifying agent such as fumed silica, hydrogenated vegetable oils or waxes. In some embodiments, the fumed silica is Aerosil® fumed silica.

In some embodiments, the stable (e.g., anhydrous) selenium disulfide formulations produced by the methods of manufacturing described herein, further comprise squalane or squalene.

In some embodiments, the amount of squalene in the stable (e.g., anhydrous) selenium disulfide formulations produced by the methods of manufacturing described herein ranges from about 10% to about 97.5%. In some embodiments, the amount of squalene in the stable (e.g., anhydrous) selenium disulfide formulations produced by the methods of manufacturing described herein ranges from about 5% to about 30%.

Certain Definitions

As used herein and in the appended claims, the singular forms "a," "and," and "the" include plural referents unless the context clearly dictates otherwise. Thus, for example, reference to "an agent" includes a plurality of such agents, and reference to "the cell" includes reference to one or more cells (or to a plurality of cells) and equivalents thereof known to those skilled in the art, and so forth. When ranges are used herein for physical properties, such as molecular weight, or chemical properties, such as chemical formulae, all combinations and sub combinations of ranges and specific embodiments therein are intended to be included. The term "about" when referring to a number or a numerical range means that the number or numerical range referred to is an approximation within experimental variability (or within statistical experimental error), and thus the number or numerical range may vary between 1% and 10% of the stated number or numerical range. The term "comprising" (and related terms such as "comprise" or "comprises" or "having" or "including") is not intended to exclude that in other certain embodiments, for example, an embodiment of any composition of matter, composition, method, or process, or the like, described herein, may "consist of" or "consist essentially of" the described features.

The term "anhydrous" as used herein refers to a composition containing less than 2% water by weight, or less than 1% water by weight, or a composition which does not contain any water.

The term "dispersion" as used herein refers to a system in which particles are dispersed in a continuous phase of a different composition or state. The dispersions are solid dispersions.

The term "agglomerates", "aggregates", and "clumps of particles" as used herein refers to a collection of particles. The terms are intended to be synonymous to each other and are used interchangeably.

The term "color stability" as used herein refers to the ability of a composition to substantially retain its original color during the time of storage. The term "substantially retain" means that there are no visually discernable changes in the color of the formulation over the time of storage or use.

The term "lotion" describes an emulsion liquid dosage form. This dosage form is generally for external application to the skin (US FDA Drug Nomenclature Monograph, number C-DRG-00201).

The term "cream" describes an emulsion semisolid dosage form, usually containing >20% water and volatiles and/or <50% hydrocarbons, waxes or polyols as the vehicle. A cream is more viscous than a lotion. This dosage form is generally for external application to the skin (US FDA Drug Nomenclature Monograph, number C-DRG-00201).

The term "ointment" describes a semisolid dosage form, usually containing <20% water and volatiles and/or >50% hydrocarbons, waxes or polyols as the vehicle. This dosage form is generally for external application to the skin or mucous membranes (US FDA Drug Nomenclature Monograph, number C-DRG-00201).

The term "solution" describes a clear, homogeneous liquid dosage form that contains one or more chemical substances dissolved in a solvent or mixture of mutually miscible solvents (US FDA Drug Nomenclature Monograph, number C-DRG-00201).

The term "suspension" refers to a heterogeneous mixture containing solid particles that are sufficiently large for sedimentation.

The term "high shear" refers to an energy dissipation range of 1000-100,000 $m^2/s^2$, and the term "low shear" refers to an energy dissipation range of 10-1000 $m^2/s^2$ as described in J. Zhang et al. Chemical Engineering and Processing 57-58 (2012) 25-41.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

EXAMPLES

Example 1—Low Temperature Process for Preparing SeS₂ Petrolatum Formulation

The active ingredient was $SeS_2$, wherein the particle size distribution D90 is less than 10 microns. The base medium was USP grade petrolatum. A reaction vessel capable of accepting a high shear mixing apparatus was charged with the USP grade petrolatum. In order to create uniform particles distribution in the petrolatum, high shear mixing was applied to disperse the particles. Addition of the active ingredients to the bulk while the whole bulk is agitated is essential in order to properly disperse the active ingredient, the high shear head was used to break the agglomerates to primary particles creating a uniform and homogeneous paste. Particles examination under the microscope in FIG. 3 showed uniform dispersion in the formulation with average particle size smaller than 25 microns which are evenly dispersed.

TABLE 1

Exemplary formulations of anhydrous ointment comprising selenium disulfide in petrolatum-based formulation

| Ingredients | 1 % w/w | 2 % w/w | 3 % w/w | 4 % w/w | 5 % w/w | 6 % w/w | 7 % w/w | 8 % w/w |
|---|---|---|---|---|---|---|---|---|
| SeS₂ | 4 | 4 | 4 | 4 | 4 | 4 | 4 | 4 |
| Petrolatum | 96 | 86 | 86 | 86 | 86 | 86 | 86 | 86 |
| Mineral oil | — | 10 | — | — | — | — | — | — |
| Caprylic/Capric Triglyceride | — | — | 10 | — | — | — | — | — |
| Dimethicone | — | — | — | 10 | — | — | — | — |
| Caprylic Acid | — | — | — | — | 10 | — | — | — |
| Isopropyl Myristate | — | — | — | — | — | 10 | — | — |
| Propylene glycol monolaurate | — | — | — | — | — | — | 10 | — |
| Propylene glycol monocaprylate | — | — | — | — | — | — | — | 10 |

Example 2—Mixing and Homogenization of Petrolatum Based Product at 40° C.

Common practices for Mixing and Homogenization of Petrolatum based products are conducted by heating the Petrolatum above the melting point to approximately 70° C. and adding the additional excipients during mixing. Heating can degrade thermolabile materials (e.g., small peptides (Glatiramer acetate), antibiotics (amoxicillin), metal oxides, plant extracts (Sea buckthorn oil), phenols (L-Dopa, levothyroxine) etc.), can cause impurities to form, and cause stability issues during storage and shelf life of a mixed petrolatum product. The semi-solid nature of the Petrolatum makes it challenging to formulate any product without the usage of heating. Mixing at low shear and high shear homogenization forms mixtures that lack uniformity and is ineffective at low temperature. This discovery enables mixing of heat labile materials or materials that tend to aggregate during mixing with Petrolatum at 40° C. to 50° C. without the need to melt the Petrolatum.

Heating of the Petrolatum enables liquefying or softening of the Petrolatum which allows for a more efficient mixing of elements with lower motor energy consumption. Surprisingly it was found that uniform mixing two or more immiscible components could be achieved without the need to heat above the Petrolatum melting point or congealing point. This was achieved by applying a high shear force to the Petrolatum which altered the Petrolatum rheology and forced it to flow. This was done gradually by accelerating the material from top to bottom to adding shear energy to the system to create laminar flow with a high viscosity in the mixing vessel. A silverson AX5 or L5M can be utilized to accelerate the Petrolatum and change the Petrolatum flow properties below the congealing temperature or melting point of petrolatum.

Five kilograms of Petrolatum was preheated to 40° C. in an incubator prior to manufacturing in 10 L glass beaker. After 24 hr in the incubator the petrolatum was placed under a Silverson L5M assembled with a square hole high shear screen and a water bath to maintain a temperature of 40° C. The mixing head was placed at the upper part of the bulk and speed was increased gradually to 6000 RPM to avoid void formation. The bulk was accelerated from top to bottom until the entire bulk is flowing. In parallel a low shear mixer with mixing paddle was placed in the bulk, after 15 minutes of mixing and acceleration of the bulk, the Petrolatum bulk started to flow at the upper part and the mixing head was lowered to the middle of the bulk accelerating the lower parts of the bulk. After steady flow was achieved through the entire bulk, the speed was lowered to 4000 RPM and Selenium Sulfide was added, Selenium Sulfide particles sucked down into the vortex and dispersed through the bulk. The process was repeated for a 15 Kg batch in a 25 L stainless steel vessel with a Silverson AX5. The Silverson AX5 contained a propeller on the mixer hinge instead of a low shear mixer with mixing paddle.

What is claimed is:

1. A method of manufacturing an ophthalmologically-acceptable pharmaceutical composition comprising an oleaginous base and 0.1% to 1% selenium disulfide weight by weight (w/w), wherein the oleaginous base comprises petrolatum and wherein the method comprises:
   (i) providing the oleaginous base;
   (ii) combining selenium disulfide with the oleaginous base to form a combination;
   (iii) mixing the combination; and
   (iv) heating the combination to a temperature below melting point of the oleaginous base before or during mixing, the temperature of the combination being maintained below the melting point of the oleaginous base before and during mixing.

2. The method of claim 1, wherein the temperature of the combination is maintained below 70 degrees Celsius during mixing.

3. The method of claim 1, wherein the oleaginous base further comprises mineral oil or vegetable oil.

4. The method of claim 1, wherein the oleaginous base is petrolatum.

5. The method of claim 1, wherein a vortex flow is formed during mixing.

6. The method of claim 3, further comprising filling the ophthalmologically-acceptable pharmaceutical composition into a dispenser.

7. The method of claim 1, further comprising filling the ophthalmologically-acceptable pharmaceutical composition into a dispenser while the ophthalmologically-acceptable pharmaceutical composition is in a semi-solid state.

8. The method of claim 1, further comprising filling the ophthalmologically-acceptable pharmaceutical composition into a dispenser while maintaining the ophthalmologically-acceptable pharmaceutical composition at a temperature below the melting point of the oleaginous base.

9. The method of claim 1, wherein the ophthalmologically-acceptable pharmaceutical composition is suitable for administration in or around an eye of a subject.

10. The method of claim 1, wherein the ophthalmologically-acceptable pharmaceutical composition is preservative-free.

11. The method of claim 1, wherein the ophthalmologically-acceptable pharmaceutical composition is preservative-free and surfactant-free.

12. The method of claim 1, wherein the ophthalmologically-acceptable pharmaceutical composition comprises 0.5 wt. % selenium disulfide.

13. The method of claim 4, wherein the ophthalmologically-acceptable pharmaceutical composition comprises 0.5 wt. % selenium disulfide.

14. The method of claim 8, wherein the ophthalmologically-acceptable pharmaceutical composition comprises 0.5 wt. % selenium disulfide.

15. The method of claim 11, wherein the ophthalmologically-acceptable pharmaceutical composition comprises 0.5 wt. % selenium disulfide.

\* \* \* \* \*